Dec. 9, 1930.  J. A. BERGREN ET AL  1,784,718
POTATO CUTTING MACHINE
Filed Aug. 16, 1926  4 Sheets-Sheet 1

INVENTORS.
JOHN A. BERGREN.
CHARLES G. BERGREN.
BY THEIR ATTORNEYS.

Dec. 9, 1930.   J. A. BERGREN ET AL   1,784,718
POTATO CUTTING MACHINE
Filed Aug. 16, 1926    4 Sheets-Sheet 2
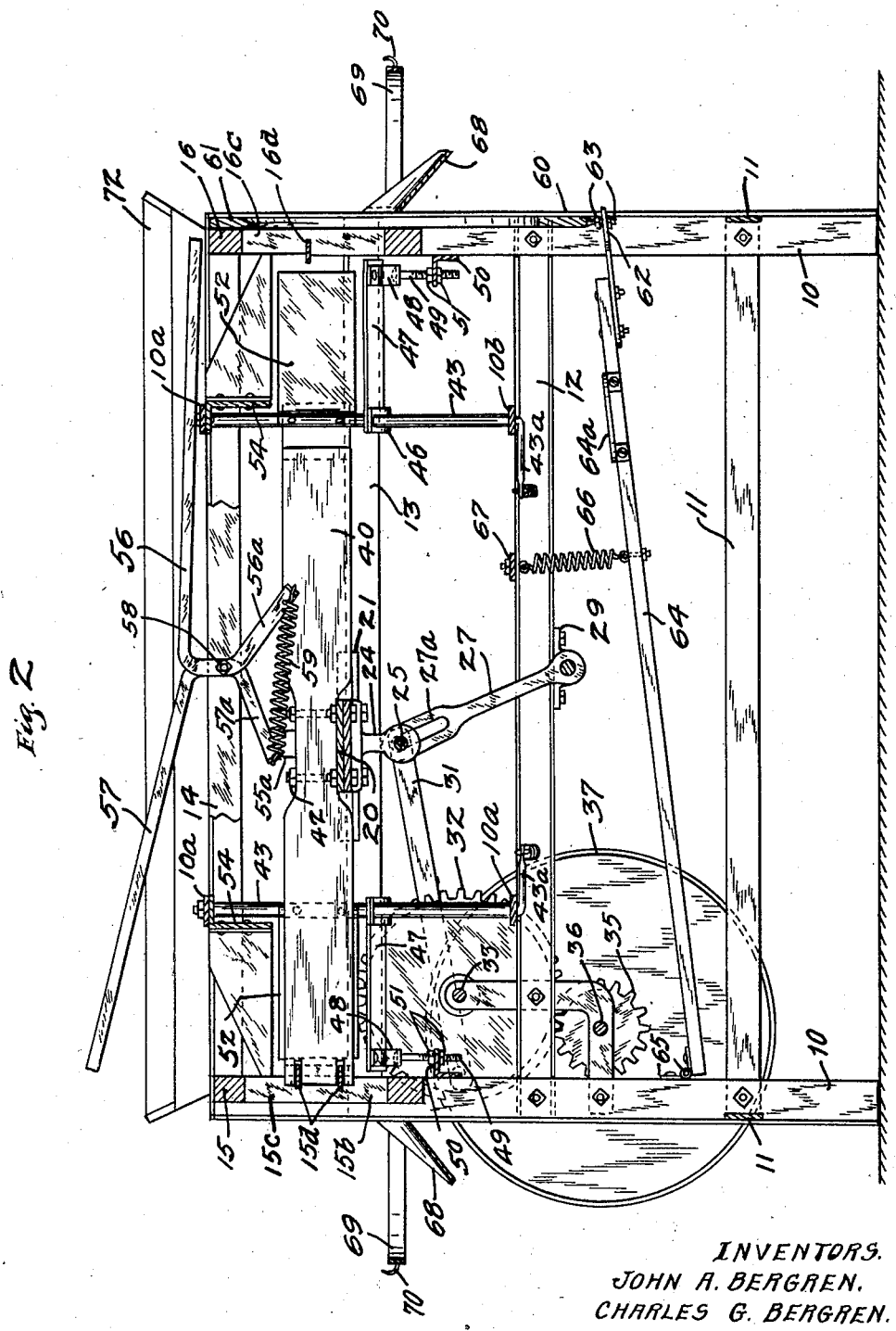
INVENTORS.
JOHN A. BERGREN.
CHARLES G. BERGREN.
BY THEIR ATTORNEYS.

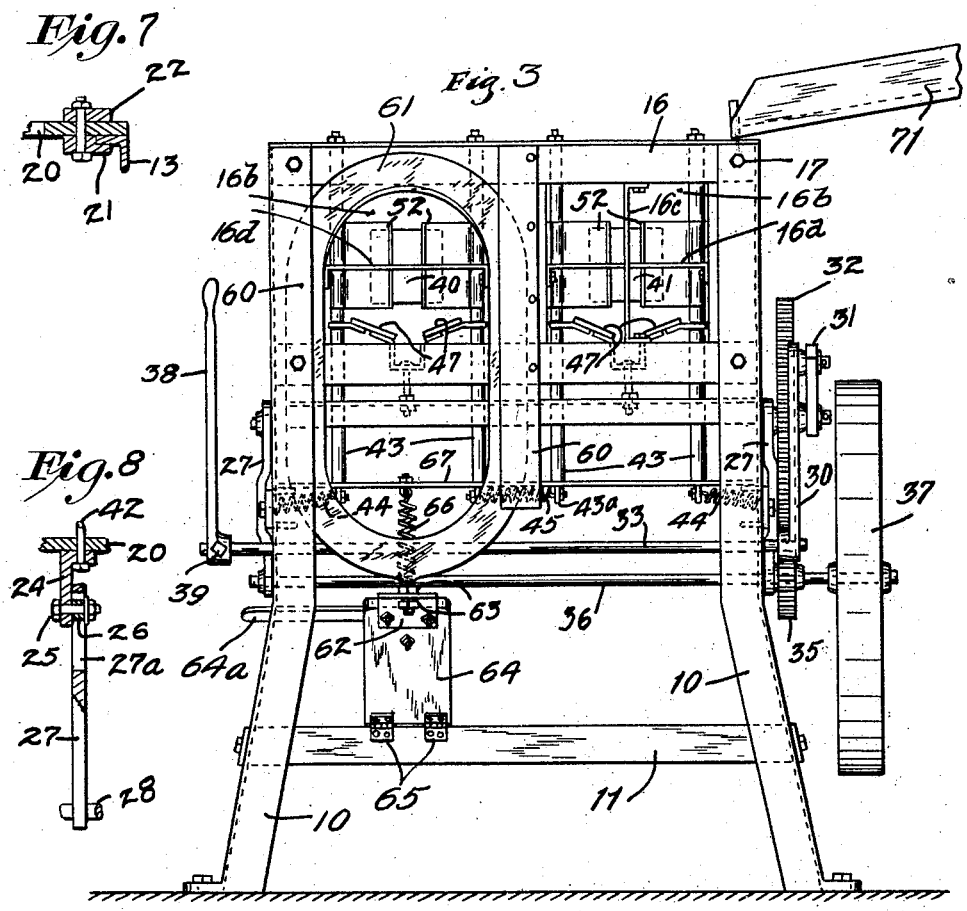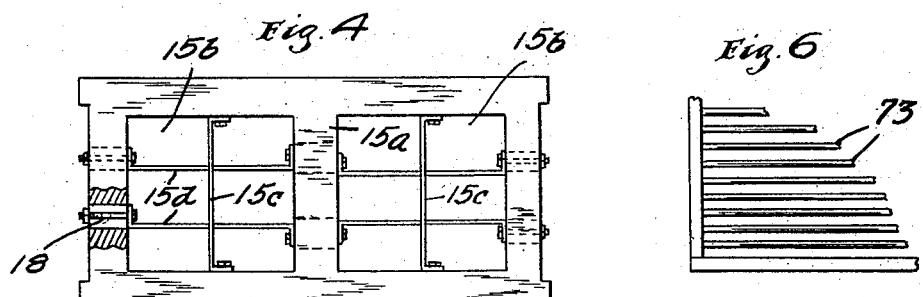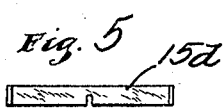

Dec. 9, 1930.  J. A. BERGREN ET AL  1,784,718
POTATO CUTTING MACHINE
Filed Aug. 16, 1926  4 Sheets—Sheet 4
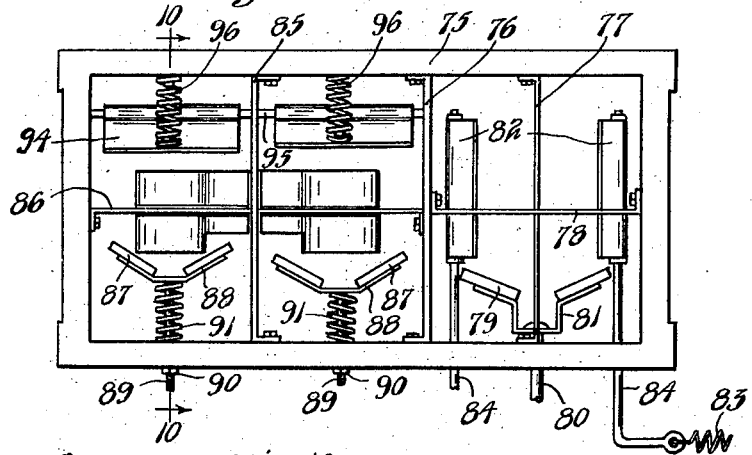
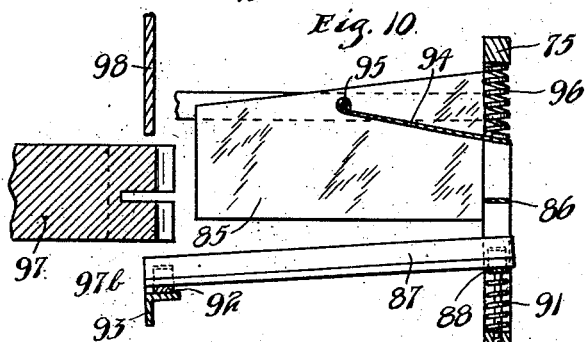
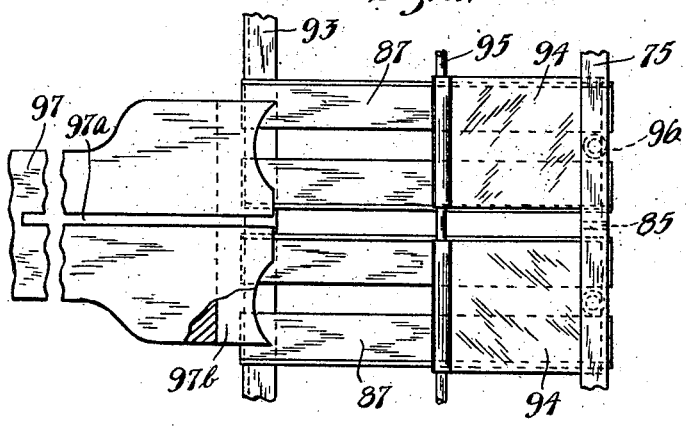
INVENTORS.
JOHN A. BERGREN.
CHARLES G. BERGREN.
BY THEIR ATTORNEYS Patented Dec. 9, 1930

1,784,718

UNITED STATES PATENT OFFICE

JOHN A. BERGREN AND CHARLES G. BERGREN, OF LAKE PARK, MINNESOTA, ASSIGNORS TO BERGREN MANUFACTURING COMPANY, A CORPORATION

POTATO-CUTTING MACHINE

Application filed August 16, 1926. Serial No. 129,463.

This invention relates to a potato cutting machine such as is used in cutting potatoes into several parts for planting. As is well known, potatoes are usually cut into sections with one or more eyes in each section and where a considerable area is to be planted, the cutting of the potatoes by hand becomes quite a large task.

It is an object of this invention, therefore, to provide a very simple and efficient machine for cutting the seed potatoes and one which can be easily and quickly operated either manually or by engine power.

It is a further object of the invention to provide such a machine comprising a plurality of horizontal and vertical knives against which the potato is pushed by a suitable plunger, the potato being guided by a trough-shaped support comprising spaced members.

It is still another object of the invention to provide such a potato cutting machine having sets of horizontal knives at each end thereof, together with double ended plungers constructed and arranged to co-operate with the knives at each end of the frame so that the potatoes may be cut with each end of the plunger and at each reciprocation thereof.

It is another object of the invention to provide a potato cutting machine comprising horizontal and vertical knives, certain ones of which are adjustable toward and from each other, together with a vertically movable semi-circular knife adapted to cut the potato transversely when a large number of pieces are desired.

These and other objects and advantages of the invention will be fully set forth in the following description made in connection with the accompanying drawings, in which like reference characters refer to similar parts throughout the several views and in which:—

Fig. 2 is a vertical section taken on line 2—2 of Fig. 1 as indicated by the arrows, a portion being shown in side elevation;

Fig. 3 is a view in end elevation of the machine;

Fig. 4 is a view in front elevation of one of the knife frames, a portion thereof being shown in vertical section;

Fig. 5 is a detail view of one of the knives used;

Fig. 6 is a partial plan view of a hopper used;

Fig. 7 is a partial vertical section taken on line 7—7 of Fig. 1;

Fig. 8 is a partial vertical section taken on line 8—8 of Fig. 1;

Fig. 9 is a view in front elevation of a modified form of cutting head used;

Fig. 10 is a vertical section taken on line 10—10 of Fig. 9, as indicated by the arrows; and Fig. 11 is a partial plan view of the structure used with the modified form shown in Fig. 9.

Figure 1:
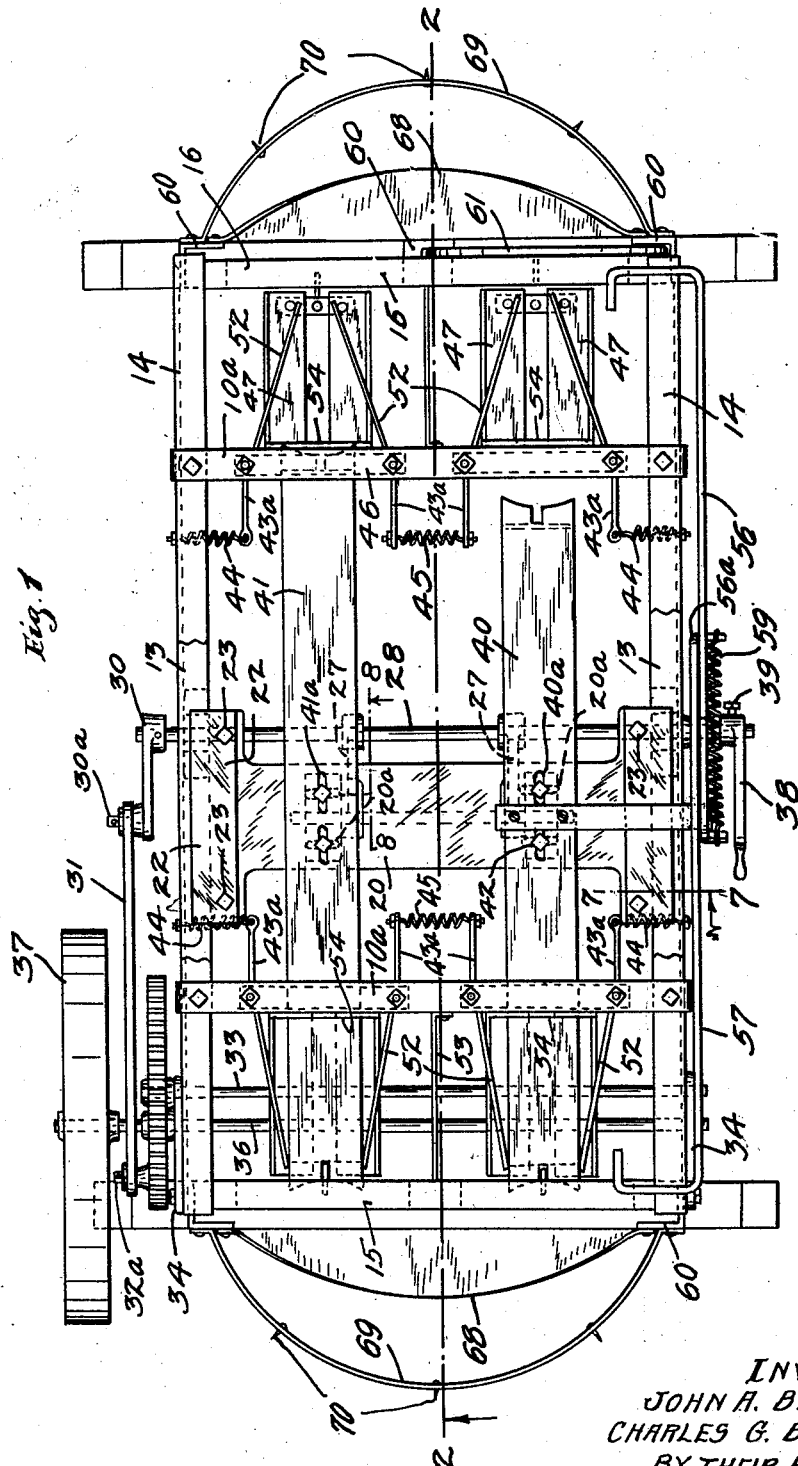
Fig. 1 is a plan view of the machine.

Referring to the drawings, the device comprises a frame having the legs or standards 10 arranged substantially at the corners of a rectangle and while these standards may be of various forms, in the embodiment of the invention illustrated they are shown as made of angle bars. The standards 10 are connected somewhat above their bottoms by the bars or strips 11 and have extending longitudinally therebetween at the sides of the frame the lower channel members 12 and upper angle bars 13. The members 10 are also connected at the top portions by the longitudinally extending angle bars 14. The frame has secured therein at each end cutter heads 15 and 16 respectively, these cutter heads being secured to the end flanges of members 10 by the bolts 17. Each of the cutter heads 15 and 16 comprises two sets of cutting knives. Each frame is divided by a central member 15a and thus forms two rectangular openings 15b. The frame 15 shown in Fig. 4 has a central vertical knife 15c in each of the openings 15b and also has a pair of horizontal knives 15d therein. The knives are formed from a strip of steel having its ends bent at right angles as shown in Figs. 4 and 5. The knives 15d are adjustable toward and from each other by having the securing bolts 18 therefor extending through slots 15e in the end and central portions of the frame 15 whereby the bolts may be loosened and the knives adjusted, after which the bolts will again be tightened. The frame 16 in one of the rectangular openings 16b has merely one horizontal knife 16d. The other opening 16b has a central vertical knife 16c as well as one central horizontal knife 16a, which horizontal knife may be adjustable as desired, as illustrated in Fig. 4. Mounted to slide longitudinally in the frame is a cross head 20 which extends between the members 13 and has widened portions at its ends. The cross head 20 rests upon the top of the angle bars 13 and has rabbeted clamping or guide members 21 secured thereto extending underneath the horizontal and inwardly extending flanges of the angle bars 13 and also has the top plates 22 secured thereto, headed and nutted bolts 23 extending through members 21, 22 and cross head 20. The cross head 20 has secured to its under side spaced depending shoes 24 having bolts 25 extending into the sides thereof carrying rollers 26. The rollers 26 are embraced by slots 27a and arms 27 secured to a shaft 28 extending transversely of the frame and journaled in bearings 29 carried on the under sides of frame members 12. The shaft 28 projects beyond the frame members 12 and at one side has an arm 30 pinned thereto, the other end of which has a crank pin 30a secured thereto on which is journaled one end of link 31, the other end of said link being journaled on a crank pin 32a projecting from one side of a spur gear 32 secured to a shaft 33 journaled in angle brackets 34 secured respectively to the outer sides of a pair of standards 10 and also to the channel members 12, said shaft 33 thus extending transversely across the frame. The gear 32 meshes with and is driven by a pinion 35 secured to one end of the shaft 36 also extending transversely of the frame and journaled in the brackets 34. The shaft 36 projects beyond the gear 35 and has secured to the end thereof a belt pulley 37. The end of shaft 28 opposite that to which arm 30 is secured has the hand lever 38 secured thereto as by a set screw 39. Cross head 20 has secured to its upper side plungers 40 and 41 held in place by the headed and nutted bolts 42 which pass through elongated slots 40a and 41a respectively in plungers 40 and 41, which slots extend longitudinally of said plungers and said bolts also pass through elongated transverse slots 20a in cross head 20. The bolts 42 also pass through and secure to the cross head the depending shoes 24. The plungers 40 and 41 are provided with vertical and horizontal grooves in their ends in alinement with the vertical and horizontal knives in the frames 15 and 16, the plungers being centrally alined with the spaces 15b and 16b in said cutter heads.

Cross bars 10a extend across the top of members 14 and cross bars 10b extend across the top of members 12 in vertical alinement with members 10a. Journaled in and extending between the members 10a and 10b are vertical rods 43, which rods have their lower ends formed as horizontally extending arms 43a extending toward the center of the machine. The arms 43a on the outer rods 43 are secured to the members 12 by tensile coil springs 44 while the inner arms 43a are connected by the tensile coil springs 45. The rods 43 are arranged in pairs, there being a pair of said rods centrally disposed in relation to the openings 15b and 16b respectively in the cutter heads 15 and 16. Each pair of rods extend through apertures formed adjacent the ends of a curved and substantially semi-cylindrical member or bar 46 which is slidable vertically on said pair of bars 43. Each member 46 has secured thereto a pair of spaced plates 47 extending toward the cutter heads at each end of the machine, which plates 47 are secured at their forward ends to bars 48 which are bent into U-shape or channel shape at their central portion to extend somewhat below the plates 47 and have secured centrally therein the upper ends of screws 49 having threaded lower ends extending through angle bars 50 secured to the end frame members 10. The screws 49 are provided at each side of angle bars 50 with lock nuts 51 whereby said screws may be raised or lowered in said angle bars 50. The bars 43 have plates 52 secured thereto which plates are disposed in vertical planes and the plates secured to each pair of rods 42 converge toward the cutter heads and are centrally disposed over the plates 47. A dividing plate 53 extends forwardly from each cross bar 10a to the center of the cutting head as shown in Figs. 1 and 2. The bars 10a also have secured thereto and depending therefrom and spaced from the rods 43 in the direction of the cutter heads, guard plates 54. The plunger 40 has secured to its upper side a bar 55 which extends to one side adjacent bar 14 where it is provided with an upwardly projecting rounded cam portion 55a. Guard members 56 and 57 are pivoted to said bar 14 substantially at the center thereof by the pivot plate 58, each of which bars has a portion extending below said pivot and reversely bent to extend toward the end of the machine. These portions 56a and 57a respectively are connected by a tension coil spring 59.

At one end of the machine rabbeted guide members 60 are reversely disposed in spaced relation at each side of one of the openings 15b in the cutter head 15 which members form a guideway for a vertically movable knife member 61. This knife member is of oblong or elliptical shape having semi-circular end portions and has a cutting edge extending about its inner semi-circular top edge. Said knife has a threaded stud projecting centrally at its lower edge which projects through an aperture in a plate 62, said head having lock nuts 63 thereon at each side of said plate. The plate 62 is secured to the front portion of the treadle bar 64, which treadle bar is hinged at its other end by the hinges 65 to one of the members 11. Treadle bar 64 has a treadle plate 64a secured to the top thereof adjacent its upper end, which projects laterally to one side of the machine. The treadle bar is connected intermediate its ends by tensile coil springs 66 to a cross-bar 67 extending across and on top of the members 12. The members 10 at each end of the machine have downwardly and outwardly extending chutes 68 secured thereto, immediately below the cutter heads 15 and 16 respectively and said members also have secured thereto outwardly extending semi-circular bails having projecting outwardly therefrom in spaced relation upwardly turned pointed members 70. A hopper 71 is supported at one side of the machine as shown in Figs. 2 and 3, which hopper has a plurality of spaced round rods 73 forming the bottom thereof.

In operation, the potatoes to be cut will be placed in the hopper 71 and will roll down the said hopper against the front side thereof. The operator will stand at the side of the machine shown at the bottom of Fig. 1. If the machine is to be motor driven, a suitable belt will be run over the pulley 37 which will be rotated thereby. This will, through the gears 35, 32 and the pitman 31 and arm 30, oscillate shaft 28. This will through the arms 27 reciprocate the cross-head 20, and the plungers 40 and 41 carried thereby. As the cross-head moves in one direction, that is, to the left as seen in Fig. 2, the cam 55a will act on the frames 57a and will raise the guard 57 as shown in Fig. 2. This will warn the operator that he should not feed a potato to this side of the machine and any danger of having his hand caught between the ends of the plungers and the knives in the cutter head will thus be eliminated. The guard 56 at the other end of the machine will be in its lowered position as shown in Fig. 2. Said guards are held in either position by the tension of spring 59.

The operator will take a potato from the hopper 71 and drop the same on to the plates 47 between the plates 52. When the plungers are again reciprocated, this potato will be pushed by the end of the plunger against the knives in the cutter head and will be cut into several pieces, depending upon which set of knives it engages. If the potato is not pushed entirely through the knives it will be engaged by the next potato and pushed entirely through. If the potato is of a size to be cut only in two parts, it will be placed at one side of the cutter head 16 having only the horizontal knife. If it is to be cut into four pieces, it will be placed at the other side of the cutter head 16 having one vertical and one horizontal knife. If it is to be cut into six pieces, it will be placed at the side of the cutter head 15 shown at the top in Fig. 1. If the potato is to be cut into more than six pieces, it will be placed in alinement with the cutter head 15 at the bottom of Fig. 1. It will be seen that the plunger 40 is somewhat shorter at one end than the other. The potato will thus be pushed only approximately half way through the knives. The operator will then step on the treadle plate 64a and will thus depress the knife 61. The knife 61 has a semi-circular edge so that it will engage the potato for quite a distance along its surface and this knife will sever the potato transversely so that it will be cut into 8 or 12 pieces. It will be understood that the plates 47 can be raised and held at different heights by means of screws 49 and nuts 51 so that the potatoes will be brought into proper alinement with the horizontal knives. If the plates should be raised so that the potato would not engage the lower horizontal knife 15d, the potato would then be cut into 8 pieces. If the potato were engaged by both horizontal knives 15d, it would be cut into 12 pieces. The potatoes are guided by and kept in proper alinement with the vertical knives by the plates 52 which are held in their normal positions shown in Fig. 1 by the springs 44 and 45, but may be separated, if necessary, by the potato as it passes therethrough. The plates 47 form a trough and it will be noted these plates are inclined toward each other. It has been found in practice that it is necessary to have spaced plates with an opening in the bottom of the trough, else the plates will collect dirt and potato sprouts which will clog against the knives and cutter heads. The potatoes, as they are pushed through the cutter heads, drop on the chutes 68 and will be guided into bags supported on bails 69 and points 70. If a potato should be dropped on top of the plungers 40 and 41, it will not be carried backward by the plungers as they move away from the cutter heads, but will be engaged by the guard plates 54 and be swept off of the plunger so that it will drop in front of the same onto the plates 47. If the machine is not to be operated by motor power, the operator will swing the crank 36 and the plungers and cross head will be reciprocated in the same manner as described.

In Figs. 9 to 11 a modified form of the machine is shown. A cutting head 75 is shown having two compartments separated by the dividing plate 76. The compartment shown at the right of this cutting head is substantially the same as that shown at the right of Fig. 3 and has the vertical cutting knife 77 and the horizontal cutting knife 78. A guideway for the potatoes delivered to said knives is formed by the plates 79 similar to the plates 47 already described and which, like said plates, are vertically adjustable by the screw 80 secured to the bracket 81 supporting said plates and to which they are secured. The side plates 82 are supported at each side of the plates 47 which are similar in all respects to the plates 52, and are adapted to be resiliently urged inwardly by springs 83 secured to the rods 84 supporting said plates.

The compartment to the left of dividing plate 76 is again subdivided by a dividing plate 85 at each side of which extends the horizontal knives 86. A guideway is provided for each of the knives 86 comprising plates 87 secured at their forward ends to the brackets 88 having secured thereto and extending downward therefrom the screws 89 having threaded ends extending through the bottom of frame or head 75 and provided with the adjusting nuts 90. Springs 91 encircle the screws 89 and urge the forward ends of plates 87 upwardly. The plates 87 at their rear ends are connected to brackets 92 which are in turn secured to a cross bar 93 which will be supported by the sides of the frame of the machine. Top plates 94 are provided above the top of each of the guideways formed by the plates 87 which top plates are hinged to a rod 95 supported at its ends in the cutter head 75 and said plates are downwardly inclined toward their outer ends and urged downwardly by coiled springs 96 engaging their top sides and the bottom of the top side of head 75. A plunger 97 is used with the cutter head which will replace one of the plungers 40 or 41 and said plunger has a central long opening or slot 97a adapted to embrace the dividing plate 85. The plunger 6 has two portions which are disposed respectively over the guideways formed by the plates 87, which portions will push the potatoes to the horizontal knives 86, said plungers also having the horizontal slots 97b adapted to embrace the knives 86.

In operation the plunger 97 has a guard plate 98 disposed thereover, having its lower edge closely adjacent the top side of the plunger.

In operation the knives 86 will be used to cut potatoes which are quite small and which need only be cut into two pieces. The operator can feed two of such potatoes to the plunger 97 at one time, one potato being placed in each guideway. The guideways can, if desired, be disposed at different heights as shown in Fig. 9 and the potatoes will be properly guided to the knives by said guideways and by the top plates 94. By the use of the structure shown in Figs. 9 to 11 these small potatoes can be very rapidly cut in the machine.

From the above description it is seen that applicant has provided a very simple and efficient potato cutting machine. The parts of the device are comparatively few and can be easily and inexpensively secured and assembled. The machine operates quickly and rapidly to efficiently cut the potatoes into the desired number of sections. The device has been amply demonstrated in actual practice and found to be very successful and efficient.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. A potato cutting machine having in combination, a cutting head, spaced members forming a substantially V-shaped open-bottomed trough adjacent and extending to said cutter head for supporting the potatoes to be cut, a plunger movable in fixed relation to said trough for pushing a potato through said cutter head, and a guard plate above said plunger and extending across the same with its edge in close proximity thereto and above the end of said trough remote from said cutter head for removing potatoes from the top of said plunger as said plunger moves away from said cutter head, whereby said potatoes will drop into said trough.

2. A potato cutting machine having in combination, a frame, cutter knives at each end thereof, a cross head reciprocable longitudinally of said frame between said knives, plungers carried by said cross head for pushing potatoes against said knives, and a guard member for each end of the machine extending towards said end and pivoted to said frame and means on said cross head for swinging said guard members to operative and inoperative positions respectively as said cross head and plungers are reciprocated.

3. A potato cutting machine having in combination, a frame, cutting knives at each end of said frame, supporting means for potatoes to be cut extending to each of said knives, a cross head reciprocable in said frame between said knives, plungers carried by said cross head for pushing potatoes on said supporting means to said knives, a pair of guard members pivoted to said frame about a common pivot, and respectively extending toward the ends of said frame, and means on said cross head for engaging said guard members and moving one to operative position and the other to inoperative position at each reciprocation of said cross head.

4. A potato cutting machine having in combination, a frame, cutting knives at each end of said frame, supporting means for potatoes to be cut extending to each of said knives, a cross head reciprocable in said frame between said knives, plungers carried by said cross head for pushing potatoes on said supporting means to said knives, a pair of guard members pivoted to said frame about a common pivot, and extending respectively toward the opposite ends of said frame, said guard members having downwardly extending and reversely bent portions forming cam arms, cam means on said cross head engaging said portions and adapted to swing said guard members respectively to operative and inoperative positions with each reciprocation of said cross head, and a tension spring connecting the ends of said portions.

5. A potato cutting machine having in combination, a frame, cutting heads carried in said frame at each end thereof, means for supporting potatoes adjacent said cutting heads, a cross head reciprocable longitudinally of said frame between said heads, plungers carried by said cross head for pushing potatoes supported by said means through said cutter heads, a lever connected to said cross head, a shaft carrying said lever, an arm at one end of said shaft, a pitman connected to said arm, a crank disk connected to said pitman, a belt pulley for operating said crank disk and a hand-lever connected to said shaft, whereby said shaft and cross-head may be operated either by said belt pulley or by said hand-lever.

6. A potato cutting machine having in combination, a cutter head comprising a compartment having a dividing plate extending thereacross, a cutting knife at each side of said dividing plate, adjustable guideways for guiding potatoes to each knife, resiliently pressed top plates above each of said guideways and a plunger movable over said guideways having a long slot therein adapted to pass at each side of said dividing plate for pushing potatoes along said guideways to said knives.

7. A potato cutting machine having in combination, a cutter head having a dividing plate extending thereacross and forwardly therefrom, a cutting knife at each side of said dividing plate, a vertically adjustable guideway leading to each of said knives and a plunger reciprocable over said guideways and having a slot extending longitudinally thereof for embracing said dividing plate whereby said plunger has a portion disposed over each guideway respectively for pushing potatoes therealong to said knives.

8. A potato cutting machine having in combination, a cutting head and an open bottom guideway leading to said head comprising spaced inclined plates, a member connecting said plates at the ends thereof adjacent said head, means for moving said member to various vertical positions and holding the same in downwardly yieldable position, means for supporting said plates at their ends remote from said head and an upwardly yieldable plate above and cooperating with said guideway.

9. A potato cutting machine having in combination, a frame, a plurality of sets of cutting knives at each end of said frame, each set comprising a vertically extending knife, open bottom guideways extending to each of said sets respectively, double-ended plungers having their ends alined respectively with said sets and reciprocable in said frame in fixed relation to said guideways, said plungers having grooved ends adapted to receive said knives, a cross-head to which said plungers are secured, reciprocable in said frame, means for positioning said cross-head and plungers in different longitudinal and transverse positions, and means for reciprocating said cross head and plunger.

10. A potato cutting machine having in combination, a cutter head comprising a frame having an opening therein, a vertical knife extending centrally across said opening, a pair of spaced horizontal knives extending across said opening disposed in horizontal planes, the edges of all of said knives being in substantially the same vertical plane, a support for holding a potato in a position to be cut by said knives, said horizontal knives being constructed and arranged to be moved toward and from each other in a vertical direction, and means for holding the same in various positions to suit different sizes of potatoes.

In testimony whereof we affix our signatures.

JOHN A. BERGREN.
CHARLES G. BERGREN.